(12) United States Patent  (10) Patent No.: US 8,474,237 B2
Tam et al.  (45) Date of Patent: *Jul. 2, 2013

(54) COLORED LINES AND METHODS OF MAKING COLORED LINES

(75) Inventors: Thomas Y-T. Tam, Chesterfield, VA (US); Huy Xuan Nguyen, Midlothian, VA (US); Mark Tallent, Midlothian, VA (US); Brian H. Waring, Chester, VA (US)

(73) Assignee: Honeywell International, Morristown, NJ (US)

( * ) Notice: Subject to any disclaimer, the term of this patent is extended or adjusted under 35 U.S.C. 154(b) by 82 days.

This patent is subject to a terminal disclaimer.

(21) Appl. No.: 13/108,061

(22) Filed: May 16, 2011

(65) Prior Publication Data

US 2011/0217549 A1   Sep. 8, 2011

Related U.S. Application Data

(63) Continuation-in-part of application No. 12/215,135, filed on Jun. 25, 2008, now Pat. No. 7,966,797.

(51) Int. Cl.
*D02G 3/36* (2006.01)
(52) U.S. Cl.
USPC ............................................. 57/250; 57/292
(58) Field of Classification Search
USPC ............................ 57/236, 241, 243, 250, 292
See application file for complete search history.

(56) References Cited

U.S. PATENT DOCUMENTS

| | | | |
|---|---|---|---|
| 4,137,394 A | 1/1979 | Meihuizen et al. | |
| 4,356,138 A | 10/1982 | Kavesh et al. | |
| 4,413,110 A | 11/1983 | Kavesh et al. | |
| 4,430,383 A | 2/1984 | Smith et al. | |
| 4,436,689 A | 3/1984 | Smith et al. | |
| 4,457,985 A | 7/1984 | Harpell et al. | |
| 4,536,536 A | 8/1985 | Kavesh et al. | |
| 4,545,950 A | 10/1985 | Motooka et al. | |
| 4,551,296 A | 11/1985 | Kavesh et al. | |
| 4,612,148 A | 9/1986 | Motooka et al. | |
| 4,617,233 A | 10/1986 | Ohta et al. | |
| 4,663,101 A | 5/1987 | Kavesh et al. | |
| 5,032,338 A | 7/1991 | Weedon et al. | |
| 5,207,732 A * | 5/1993 | Stark ............................ | 43/44.98 |
| 5,246,657 A | 9/1993 | Yagi et al. | |
| 5,286,435 A | 2/1994 | Slutsker et al. | |
| 5,342,567 A | 8/1994 | Chen et al. | |
| 5,573,850 A * | 11/1996 | Cunningham et al. ........ | 428/373 |
| 5,578,374 A | 11/1996 | Dunbar et al. | |

(Continued)

FOREIGN PATENT DOCUMENTS

| | | |
|---|---|---|
| DE | 30 04 699 A1 | 8/1980 |
| GB | 2 051 667 A | 1/1981 |
| WO | 2006/040191 A1 | 4/2006 |

*Primary Examiner* — Shaun R Hurley

(57) ABSTRACT

Colored monofilament ultrahigh molecular weight polyolefin lines, and methods of making such colored lines are disclosed. The colorant can result in a product that provides a visual indication of metered length. When the colorant has a luminescent response to ultraviolet or infrared light, a line can change color based on the environmental conditions to which it is exposed. Methods of making the line can include feeding a substantially untwisted multifilament ultrahigh molecular weight polyolefin yarn; coating the substantially untwisted multifilament yarn with at least one colorant; twisting the coated multifilament yarn; and heating the twisted multifilament yarn to a temperature and for a time sufficient to at least partially fuse adjacent filaments together while stretching the yarn.

18 Claims, 3 Drawing Sheets

U.S. PATENT DOCUMENTS

| | | |
|---|---|---|
| 5,702,657 A | 12/1997 | Yoshida et al. |
| 5,736,244 A | 4/1998 | Kavesh et al. |
| 5,741,451 A | 4/1998 | Dunbar et al. |
| 5,958,582 A | 9/1999 | Dunbar et al. |
| 5,972,498 A | 10/1999 | Kavesh et al. |
| 6,148,597 A | 11/2000 | Cook |
| 6,448,359 B1 | 9/2002 | Kavesh |
| 6,969,553 B1 | 11/2005 | Tam et al. |
| 7,344,668 B2 | 3/2008 | Tam et al. |
| 7,370,395 B2 | 5/2008 | Tam |
| 7,966,797 B2 * | 6/2011 | Nguyen et al. .................. 57/292 |

* cited by examiner

COLORED LINES AND METHODS OF MAKING COLORED LINES

RELATED APPLICATIONS

This is a continuation-in-part of U.S. application Ser. No. 12/215,135, filed on Jun. 25, 2008, now U.S. Pat. No. 7,966,797.

FIELD OF THE INVENTION

The present technology relates to improvements in lines formed from high tenacity polyolefin fibers, and more specifically to such lines having coloration that provides useful visual properties.

DESCRIPTION OF RELATED ART

Previously known lines formed from high tenacity polyolefin fibers have been used, for example, as fishing lines. Such fibers may be high tenacity polyethylene fibers, such as SPECTRA™ extended chain polyethylene fibers and yarns from Honeywell International Inc., as well as other suppliers. Such fishing lines have been commercially successful.

Typically, high tenacity polyolefin fibers are made by a spinning a solution containing polyethylene gel swelled with a suitable solvent into filaments of ultrahigh molecular weight polyethylene. The solvent is removed and the resulting yarn is stretched or drawn in one or more stages. In general, such filaments are known as "gel spun" polyolefins, with gel spun polyethylene being the most commercially sold.

Fishing lines from gel spun polyethylene yarns are typically made by braiding multifilament yarns. These fishing lines have advantages over other braided fishing line materials (such as polyesters) as well as nylon monofilament lines, as the ultrahigh molecular weight polyethylene lines have higher strength. However, many anglers prefer the feel of a monofilament fishing line, and braided lines may fray at the end of the line. Also, braided polyethylene lines need to be cut with a shearing device such as a scissor rather than the commonly used compression type line clipper.

It has been proposed in U.S. Pat. No. 6,148,597 to provide polyolefin fishing line that is more monofilament-like in handling. This patent suggests forming braided or twisted yarns and then heating the yarns so that they fuse together. Certain coating materials are suggested to aid in the fusing of the multifilament yarns. The yarns are also subject to a drawing step, with draw ratios of between 1.01 and 2.5 being disclosed.

An improvement on the above technique is described in WO 2006/040191 A1, wherein multifilament yarns are drawn at a ratio of at least 2.7. The result is the to be a fishing line having improved properties such as higher elongation at break.

Fishing lines which are colored are preferred by many anglers. Heretofore, this has been achieved by introducing the braided or twisted yarn into a coating bath containing a colorant. However, it has been found that the colored coating tends to come off with vigorous rubbing. It would be desirable to provide a monofilament polyolefin fishing line that had improved color fastness.

SUMMARY OF THE INVENTION

The present technology related to colored lines, and particularly to lines that have various coloration properties, such as color coded metered length or color changing properties.

In one aspect a method of making colored monofilament ultrahigh molecular weight polyolefin line is provided that includes steps of: feeding at least one substantially untwisted multifilament ultrahigh molecular weight polyolefin yarn having a length; coating at least a portion the length of the substantially untwisted multifilament yarn with at least one colorant; twisting the coated multifilament yarn; and heating the twisted multifilament yarn to a temperature and for a time sufficient to at least partially fuse adjacent filaments together while stretching the yarn to a stretch ratio from about 3 to about 10 to form the colored line.

In another aspect, a method of making colored monofilament ultrahigh molecular weight polyolefin line is provided that includes steps of: feeding at least one substantially untwisted multifilament ultrahigh molecular weight polyolefin yarn having a length; coating the substantially untwisted multifilament yarn with a plurality of colorants in series along the length of the substantially untwisted multifilament yarn; twisting the coated multifilament yarn; and heating the twisted multifilament yarn to a temperature and for a time sufficient to at least partially fuse adjacent filaments together while stretching the yarn to a stretch ratio from about 3 to about 10 to form the colored line.

In a third aspect, a method of making colored monofilament ultrahigh molecular weight polyolefin line is provided that includes steps of: feeding at least one substantially untwisted multifilament ultrahigh molecular weight polyolefin yarn having a length; coating at least a portion the length of the substantially untwisted multifilament yarn with at least one colorant, wherein the at least one colorant has a luminescent response when exposed to ultraviolet light or infrared light; twisting the coated multifilament yarn; and heating the twisted multifilament yarn to a temperature and for a time sufficient to at least partially fuse adjacent filaments together while stretching the yarn to a stretch ratio from about 3 to about 10 to form the colored line.

BRIEF DESCRIPTION OF THE DRAWINGS

Specific examples have been chosen for purposes of illustration and description, and are shown in the accompanying drawings, forming a part of the specification.

DETAILED DESCRIPTION

Figure 1:
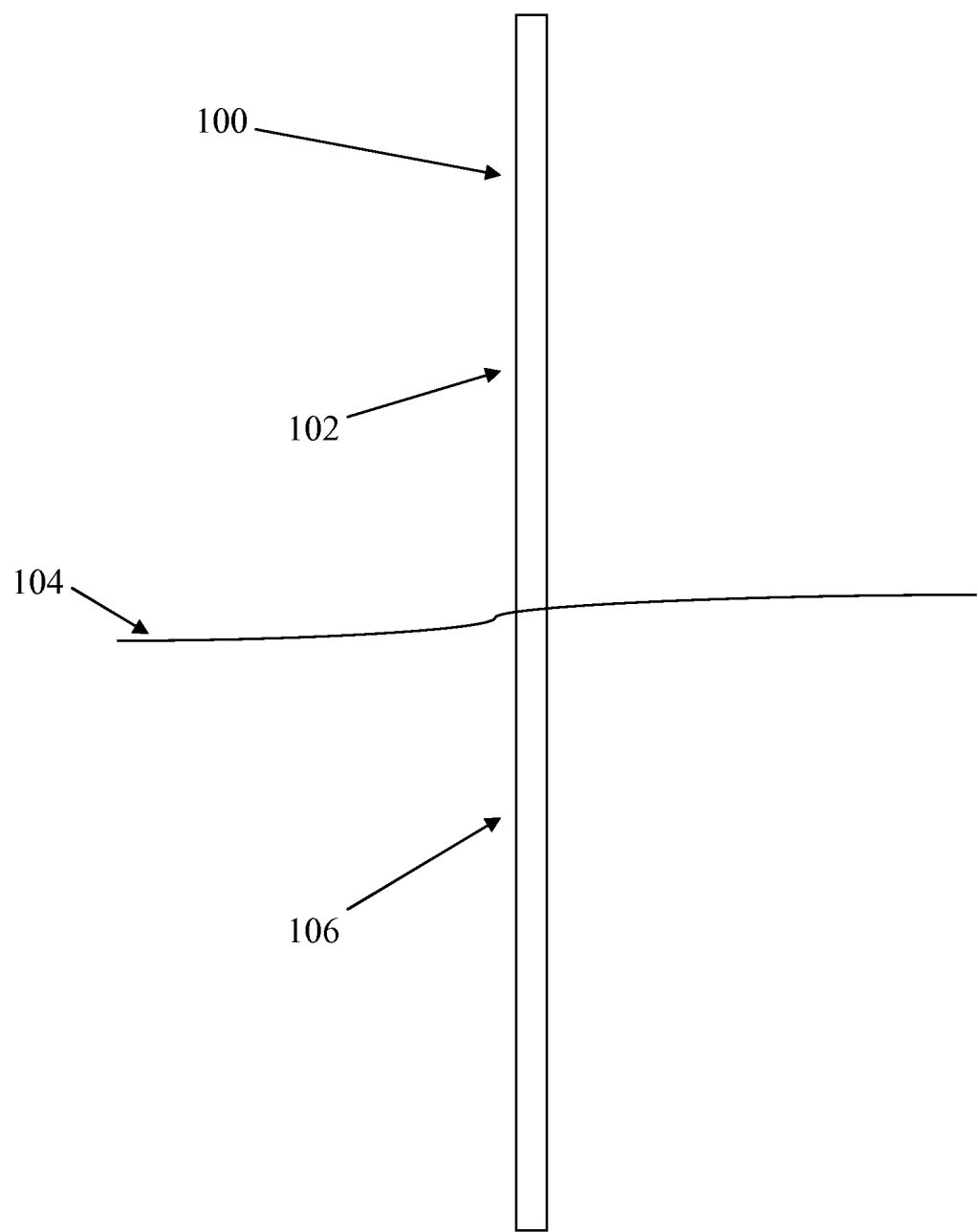
FIG. 1 illustrates one embodiment of a fishing line having a colorant that has a luminescent response when exposed to ultraviolet light.

The multifilament yarns used herein are formed from high tenacity polyolefin filaments. The lines of the present technology can be used as fishing lines, but there are also many other applications in which such lines can be useful. For example, lines formed from high tenacity polyolefin fibers can also be used as kite string, bow string, tennis racket string, parachute string, sewing thread, yachting rope, lifting rope and the like.

As used herein, the term "high tenacity" fibers or filaments means fibers or filaments which have tenacities equal to or greater than about 7 g/d. Preferably, these fibers have initial tensile moduli of at least about 150 g/d and energies-to-break of at least about 8 J/g as measured by ASTM D2256. As used herein, the terms "initial tensile modulus", "tensile modulus" and "modulus" mean the modulus of elasticity as measured by ASTM 2256 for a yarn.

For the purposes of the present invention, a filament is an elongate body the length dimension of which is much greater that the transverse dimensions of width and thickness. Accordingly, the term filament includes fiber, ribbon, strip, staple and other forms of chopped, cut or discontinuous fiber or continuous fiber. The term "fiber" or "filament" includes a plurality of any of the foregoing or a combination thereof. A yarn is a continuous strand comprised of many fibers or filaments. Preferred are continuous multifilament yarns.

Preferably, the high tenacity fibers have tenacities equal to or greater than about 10 g/d, more preferably equal to or greater than about 15 g/d, even more preferably equal to or greater than about 20 g/d, and most preferably equal to or greater than about 25 g/d.

The fibers utilized in the yarn of the line construction of this invention comprise extended chain (also known as ultrahigh molecular weight or high modulus) polyolefin fibers, particularly high tenacity polyethylene fibers and polypropylene fibers, and blends thereof. The fibers may be gel-spun, solution-spun or extruded.

The cross-sections of fibers useful herein may vary widely. They may be circular, flat or oblong in cross-section. They may also be of irregular or regular multi-lobal cross-section having one or more regular or irregular lobes projecting from the linear or longitudinal axis of the fibers. It is preferred that the fibers be of substantially circular, flat or oblong cross-section, most preferably substantially circular cross-section.

U.S. Pat. No. 4,457,985 generally discusses such high molecular weight polyethylene and polypropylene fibers, and the disclosure of this patent is hereby incorporated by reference to the extent that it is not inconsistent herewith. In the case of polyethylene, suitable fibers are those of weight average molecular weight of at least about 150,000, preferably at least about one million and more preferably between about two million and about five million. Such high molecular weight polyethylene fibers may be spun in solution (see U.S. Pat. Nos. 4,137,394 and 4,356,138), or a filament spun from a solution to form a gel structure (see U.S. Pat. No. 4,413,110, German Off. No. 3,004,699 and GB Patent 2051667), or the polyethylene fibers may be produced by a rolling and drawing process (see U.S. Pat. No. 5,702,657). As used herein, the term polyethylene means a predominantly linear polyethylene material that may contain minor amounts of chain branching or comonomers not exceeding about 5 modifying units per 100 main chain carbon atoms, and that may also contain admixed therewith not more than about 50 wt % of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as antioxidants, lubricants, ultraviolet screening agents, and the like which are commonly incorporated.

High tenacity polyethylene multifilament yarns are preferred, and these are available, for example, under the trademark SPECTRA™ fibers and yarns from Honeywell International Inc. of Morristown, N.J., U.S.A.

Depending upon the formation technique, the draw ratio and temperatures, and other conditions, a variety of properties can be imparted to these precursor fibers. The tenacity of the polyethylene fibers are at least about 7 g/d, preferably at least about 15 g/d, more preferably at least about 20 to 5 g/d, still more preferably at least about 25 g/d and most preferably at least about 30 g/d. Similarly, the initial tensile modulus of the fibers, as measured by an Instron tensile testing machine, is preferably at least about 300 g/d, more preferably at least about 500 g/d, still more preferably at least about 1,000 g/d and most preferably at least about 1,200 g/d. These highest values for initial tensile modulus and tenacity are generally obtainable only by employing solution grown or gel spinning processes. Many of the filaments have melting points higher than the melting point of the polymer from which they were formed. Thus, for example, high molecular weight polyethylene of about 150,000, about one million and about two million molecular weight generally have melting points in the bulk of 138° C. The highly oriented polyethylene filaments made of these materials have melting points of from about 7° C. to about 13° C. higher. Thus, a slight increase in melting point reflects the crystalline perfection and higher crystalline orientation of the filaments as compared to the bulk polymer.

Preferably the polyethylene employed is a polyethylene having fewer than about one methyl group per thousand carbon atoms, more preferably fewer than about 0.5 methyl groups per thousand carbon atoms, and less than about 1 wt. % of other constituents.

Similarly, highly oriented high molecular weight polypropylene fibers of weight average molecular weight at least about 200,000, preferably at least about one million and more preferably at least about two million may be used. Such extended chain polypropylene may be formed into reasonably well oriented filaments by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity is preferably at least about 8 g/d, more preferably at least about 11 g/d. The initial tensile modulus for polypropylene is preferably at least about 160 g/d, more preferably at least about 200 g/d. The melting point of the polypropylene is generally raised several degrees by the orientation process, such that the polypropylene filament preferably has a main melting point of at least 168° C., more preferably at least 170° C. The particularly preferred ranges for the above described parameters can advantageously provide improved performance in the final article. Employing fibers having a weight average molecular weight of at least about 200,000 coupled with the preferred ranges for the above-described parameters (modulus and tenacity) can provide advantageously improved performance in the final article.

In the case of extended chain polyethylene fibers, preparation and drawing of gel-spun polyethylene fibers are described in various publications, including U.S. Pat. Nos. 4,413,110; 4,430,383; 4,436,689; 4,536,536; 4,545,950; 4,551,296; 4,612,148; 4,617,233; 4,663,101; 5,032,338; 5,246,657; 5,286,435; 5,342,567; 5,578,374; 5,736,244; 5,741,451; 5,958,582; 5,972,498; 6,448,359; 6,969,553 and 7,344,668, the disclosures of which are expressly incorporated herein by reference to the extent not incompatible herewith.

The lines of this invention comprise the high tenacity polyolefin fibers, or consist essentially of the high tenacity polyolefin fibers, or consist of the high tenacity polyolefin fibers, and the polyolefin fibers preferably are high tenacity polyethylene fibers. The multifilament yarns may be formed by any suitable technique, including melt extrusion. The multifilament yarns are preferably aligned in a substantially uniaxial direction along the length of the line. By "substantially uniaxial direction" is meant that all or almost all (for example, at least about 95%, more preferably at least about 99%) of the yarns extend in a single direction. The multifilament feeder yarns are substantially untwisted. By "substantially untwisted" means that the yarns have zero twist or very little twist along their length (for example, no more than about 0.1 turns per inch (4 turns per meter), preferably no more than about 0.05 turns per inch (2 turns per meter) along the length of the yarn).

The yarns of the high tenacity fibers used herein may be of any suitable denier, such as, for example, about 100 to about 10,000 denier, more preferably from about 1000 to about 8,000 denier, still more preferably from about 650 to about 6000 denier, and most preferably from about 1200 to about 4800 denier.

The number of filaments forming the multifilament feeder yarns used in this invention may vary widely depending on the desired properties. For example, the number of filaments in a yarn may range from about 10 to about 3000, more preferably from about 30 to about 1500, and most preferably from about 60 to about 1200. Although not required, the number of filaments in each multifilament precursor yarn preferably is substantially the same.

Likewise, the number of multifilament yarns or tows forming the lines of this invention may vary widely. For example, the number of multifilament yarns may range from about 1 to about 16, more preferably from about 1 to about 8. Thus, there is at least one multifilament yarn, and preferably a plurality of the multifilament yarns that are processed in accordance with the invention.

In accordance with the method of this invention, the substantially untwisted multifilament yarn or yarns are coated with a colorant prior to twisting. Any suitable coating technique may be employed. Examples of coating apparatus that are useful in the method of this invention include, without limitation: lube rolls, kiss rolls, dip baths, spray coaters, etc. Alternatively, extrusion coaters may be employed. The colorant is preferably supplied in a carrier and may be in the form of a solution, dispersion or an emulsion using any suitable solvent, such as water or an organic solvent (such as methyl ethyl ketone, acetone, ethanol, methanol, isopropyl alcohol, cyclohexane, ethyl acetone, etc. and combinations thereof). The colorant is preferably applied as a continuous coating, although a discontinuous coating may be employed if desired.

The colorant can be mixed into and carried in a carrier material to form a colorant coating composition. Such a carrier material can be, for example, a thermoplastic resin. Examples of such thermoplastic resins include, without limitation, polyolefin resins such as low density polyethylene, linear low density polyethylene, high density polyethylene, polyolefin copolymers, e.g., ethylene copolymers such as ethylene-acrylic acid copolymer, ethylene-ethyl acrylate copolymer, ethylene-vinyl acetate copolymer, and the like, polyurethane, and the like, and blends of one or more of the foregoing. The thermoplastic resin preferably has a lower melting point than the specific polyolefin fiber that is utilized, and is a drawable material.

In one example, the yarn or yarns can be dipped into a bath containing the colorant coating composition. Following coating by any technique, excess coating composition may be removed by any one or more suitable means, such as being squeezed out, blown off or drained off, or air dried or dried in a heating device.

As the colorant, any suitable coloring agent may be employed. Examples are dyes and pigments, both aqueous and organic. Non-limiting examples of such colorants are copper phthalocyanine and the like. Some of the colors that can be provided by colorants include, for example, blue, green, yellow, red and black. In some examples, the colorant can be visible under any standard lighting conditions, such as incandescent light, fluorescent light, or sunlight. In other examples, the colorant can be visible under only certain types of light, such as ultraviolet light or infrared light.

Figure 2:
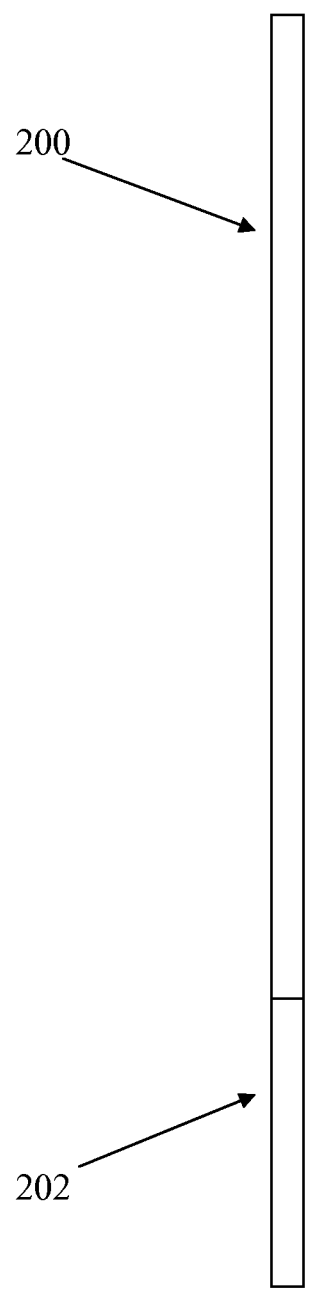
FIG. 2 illustrates one embodiment of a line having a colorant that has a luminescent response when exposed to ultraviolet light or infrared light.

In some examples, at least one colorant can be applied to the yarn that have a luminescent response when exposed to ultraviolet or infrared light. Luminescent responses can include, for example, florescence, luminescence, or combinations thereof. In such examples, the colorant may not be visible, such as to a human eye or animal eye, unless and until it is exposed to ultraviolet or infrared light. In at least one example, the use of such colorant can result in a line that changes color depending upon the environmental lighting conditions. When used in fishing line, for example, as illustrated in FIG. 1, a colorant that has a luminescent response to ultraviolet light can be applied to at least a portion of the length of the yarn, preferably the entire length of the yarn, and can result in a fishing line 100 that has a visible color 102 above the surface of the water 104, where it can be exposed to sunlight or another ultraviolet light source, and has a second color 106 below the surface of the water. Preferably the second color 106 is actually clear or substantially clear. In another example, a colorant that has a luminescent response to ultraviolet light or infrared light can be applied to at least one portion of the length of a yarn, such as, for example, to and end portion of the yarn, which results in a line having at least one colored portion. As illustrated in FIG. 2, the resulting line 200 can appear to be clear, or substantially clear, under normal indoor lighting conditions, and the colorant on the at least one colored portion 202 of the line can provide a luminescent response when exposed to ultraviolet or infrared light in order to act as an identifying mark to indicate authenticity of the line.

Some examples of colorants that have a luminescent response when exposed to ultraviolet or infrared light include inorganic materials such as $La_2O_2S$:Eu, $ZnSiO_4$:Mn, and $YVO_4$:Nd. Such materials are sold commercially by Honeywell International Inc. under the trade names LUMILUX™ Red CD 168, LUMILUX™ Green CD 145 and LUMILUX™ IR-DC 139, respectively. Each is excited by ultraviolet radiation. LUMILUX™ Red CD 168 and LUMILUX™ Green CD 145 fluoresce in the visible. LUMILUX™ IR-DC 139 fluoresces in the infra-red.

Figure 3:
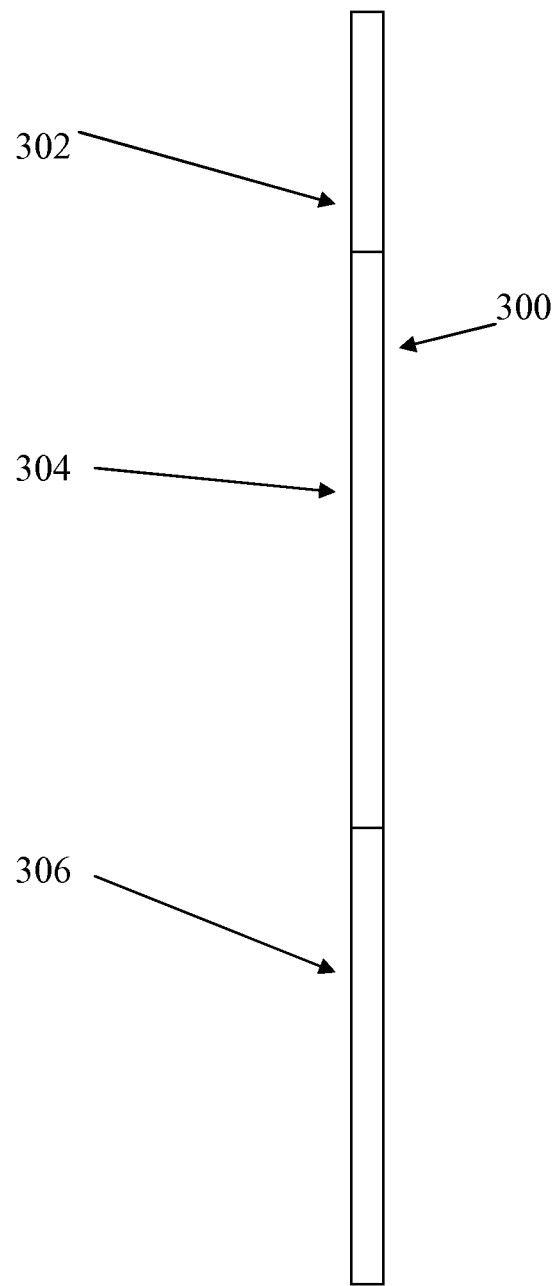
FIG. 3 illustrates one embodiment of a line having a plurality of colorants applied in series along the length of the fishing line.

In one example, a plurality of colorants can be applied to the yarn in series, to provide a visual indication of distance along the length of the yarn. For example, as illustrated in FIG. 3, a first colorant 302 can be applied to a first portion of the length of the yarn 300, and a second colorant 304 can be applied to a second portion of the length of the yarn 300. Additional colors can optionally be applied to additional portions of the length of the yarn, such as, for example, a third colorant 306 being applied to a third portion of the length of the yarn. The colorants may be applied in a pattern, in a repeating series, or in a non-repeating series. In a fishing line product, for example, the plurality of colorants can provide a visual indication of the amount of the length of the fishing line that has been cast, and may also provide a visual indication of the amount of the length of the fishing line that is under the water after the line has been cast.

The plurality of colorants can be applied in any suitable manner, such as by the methods described above. In one example, a plurality of colorants can be applied to the yarn by extrusion coating. In such an example, a method of applying the plurality of colorants can include passing the yarn through an extrusion coating device having a plurality of coating heads, where each coating heads is configured to apply a colorant to the yarn, and operating the plurality of coating heads to apply a plurality of colorants in series along the length of the yarn.

The amount of the colored coating on the yarns may vary widely. For example, the coating may comprise from about 1 to about 40 percent by weight of the total weight of the yarns after drying, more preferably from about 2 to about 25 percent by weight, and most preferably from about 5 to about 15 percent by weight. Of course, the weight of the colorant in the coating material may be significantly less than the weight of the colored coating. Typically, the amount of colorant in the colored coating may range from about 0.5 to about 20 weight percent, more preferably from about 2 to about 15 weight percent, and most preferably from about 4 to about 10 weight percent.

Following drying of the coated, substantially untwisted polyolefin multifilament yarn or yarns, they are subjected to a twisting operation to provide the desired degree of twisting. Any suitable twisting device may be employed for this purpose, such as a ring twister, a direct cabler, and the like. Preferably, the yarns are imparted with a minimum twist of about 2 turns per inch (79 turns per meter). More preferably, the yarn or yarns are twisted to a relatively high degree, such as from about 3 to about 15 turns per inch (118 to 590 turns per meter), more preferably from about 4 to about 11 turns per inch (157 to 433 turns per meter), and most preferably from about 5 to about 7 turns per inch (197 to 276 turns per meter). Two or more multifilament yarn ends may be twisted together and then further processed, or each multifilament yarn end may be twisted and then two or more of the twisted yarn ends can be cabled together for further processing. For example, the yarns may be twisted first in a "z" direction a suitable number of times and then in the opposite "s" direction a desired number of times to obtain a balanced cable yarn, or vice versa.

The colored coated and twisted multifilament yarn or yarns are then subjected to a drawing step at an elevated temperature. The drawing step may be a single drawing step or multiple drawing steps. Preferably, the yarns are drawn in a hot air oven. Such ovens are known in the art, and an example of such an oven is described in U.S. Pat. No. 7,370,395, the disclosure of which is hereby incorporated by reference to the extent that it is not inconsistent herewith. Drawing of the multifilament yarn or yarns is preferably conducted within the melting point range of the polyolefin. Examples of techniques for drawing polyolefin multifilament yarns are disclosed in the aforementioned U.S. Pat. No. 6,148,597 and WO 2006/040191 A1, the disclosures of which are hereby incorporated by reference to the extent that they are not inconsistent herewith. Drawing is desirably achieved by one or more stretch rollers that desirably may be outside of the ovens, or alternatively inside or between one or more ovens. One oven or the first part of one oven may be employed to soften the filaments and another oven or another party of an oven may be employed to fuse the filaments together into a line.

Preferably, the multifilament yarn or yarns are heated to a relatively high temperature, such as from about 135° C. to about 160° C., more preferably from about 152° C. to about 157° C., and most preferably from about 153° C. to about 155° C. As mentioned above, during the heating step the multifilament yarns are drawn (or stretched) to a desired degree. Any desired stretch ratio may be employed, typically at least about 2, such as from about 2 to about 10, more preferably from about 3 to about 8, and most preferably from about 4 to about 6. Desirably, line tension is applied throughout the drawing step.

The yarn or yarns are heated and drawn for a desired period of time. The actual dwell time in a heating apparatus such as an oven depends on several factors, such as the temperature of the oven, the length of the oven, the type of oven (e.g., hot air circulating oven, heated bath, etc.), etc.

The conditions of heat and drawing are chosen such that the adjacent filaments of a multifilament yarn are at least partially fused together. It is believed that the outer surface temperature of the filaments are at or within the melting range of the polymer constituting the filaments such that the surfaces of the filaments begin to soften and fuse at contact points along the length of the outer surfaces of the filaments.

During the drawing step under elevated temperatures, the colored coating penetrates the polyolefin fiber and thus becomes an integral part thereof.

The heating and drawing step transforms the multifilament yarn or yarns into monofilament line, with the multifilament yarn being fused together at least to some degree. The resultant line is a monofilament or is substantially a monofilament (monofilament-like) has the feel of a monofilament line. However, in contrast to braided yarns it does not unravel when cut. As used herein, the term "monofilament" means monofilament or monofilament-like. The feeder yarn is a relatively heavy denier, low tenacity yarn whereas the monofilament after drawing has a relatively low denier and high tenacity.

The resulting line may be of any suitable diameter. For example, the monofilament line may have a diameter of from about 0.001 mm to about 3 mm, more preferably from about 0.1 mm to about 1 mm, and most preferably from about 0.15 mm to about 0.5 mm.

Surprisingly, it has been found that when the multifilament yarn or yarns are colored prior to twisting, rather than after twisting, line formed from such yarns exhibits increased color-fastness. The line is resistant to fading due to exposure to sunlight (UV light) as well as due to rubbing or other abrasion action. Moreover, surprisingly the resulting line exhibits improved abrasion resistance.

The following non-limiting examples are presented to provide a more complete understanding of the invention. The specific techniques, conditions, materials, proportions and reported data set forth to illustrate the principles of the invention are exemplary and should not be construed as limiting the scope of the invention.

EXAMPLES

Example 1

A fishing line is formed from multifilament extended chain polyethylene yarns. Each yarn is formed from SPECTRA™ 900 fibers, available from Honeywell International Inc. The yarns have a denier of 1200, with 120 filaments in each yarn. The yarn tenacity is 30 g/d. One multifilament yarn having essentially zero twist is fed into a coating bath containing an aqueous solution of green dye pigment, based on copper phthalocyanine, dispersed in a polyethylene thermoplastic resin. The solids content of the coating solution is about 40 weight percent. The pick up weight of the coating onto the yarns is about 15 percent, based on the total weight of the multifilament yarns. The yarns are dried in a hot air oven (temperature of about 80° C. to about 110° C.). The yarns are then given a twist of 11 turns per inch (433 turns per meter). Tension is maintained in the process to prevent untwisting of the yarns.

The twisted yarns are fed into a heating apparatus as disclosed in the aforementioned U.S. Pat. No. 7,370,395, using a total of 6 horizontally aligned and abutting hot air circulating ovens. A first set of rolls is adjacent the inlet side of the ovens and a second set of rolls are adjacent the outlet side of the ovens. The yarns are unsupported in the ovens and are transported through the ovens in an approximate straight line. The speeds of the first and second set of rolls are selected to provide a draw ratio in the ovens of about 4.0. The oven temperature is about 155° C. The multifilament yarns are fused in the ovens, with adjacent yarns being at least partially fused together. The resulting structure is wound up on a take off roll and is in the form of a monofilament-like fishing line.

The color-fastness of the fishing line is tested by abrading it against a metal bar with hexagonal cross-section (the Hex Bar abrasion resistance test). The monofilament fishing line is tensioned with a 50 gram weight, and abraded back and forth over the hexagonal metal bar with "shoe-shining" like action for 2,500 cycles. The fishing line is then examined for retained color and residual breaking strength.

The monofilament fishing line retains its vibrant color and the coating also provides added abrasion resistance, such that the fishing line retains about 50 to 80 percent of its original breaking strength.

Example 2

Fishing line is prepared in a manner similar to Example 1, except that the colorant is LUMILUX™ Red CD 168, which contains $La_2O_2S$:Eu, instead of a green dye pigment. The colored fishing line is tested for color-fastness and abrasion resistance via the same Hex Bar test of Example 1. After 2,500 cycles, the colrant still provides a luminescent response when exposed to ultraviolet light, and the fishing line retains about 50 to 80 percent of its original breaking strength.

Example 3 (Comparative)

Fishing line is prepared in a manner similar to Example 1, except that the colored coating being applied after the yarn has been twisted, and fused and drawn. The colored fishing line is tested for color-fastness and abrasion resistance via the same Hex Bar test of Example 1. After 2,500 cycles, the color coating is found to have been mostly abraded from the line. The fishing line retains only about 20 to 40 percent of its original breaking strength.

Example 4 (Comparative)

Fishing line is prepared in a manner similar to Example 3, except that the colored coating being applied after twisting and before fusing and drawing. The colored fishing line is tested for color-fastness and abrasion resistance via the same Hex Bar test of Example 1. After 2,500 cycles, the color coating is found to have been mostly abraded from the line. Results similar to Example 2 are noted.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A method of making colored monofilament ultrahigh molecular weight polyolefin line, the method comprising the steps of:
    feeding at least one substantially untwisted multifilament ultrahigh molecular weight polyolefin yarn having a length;
    coating at least a portion the length of the substantially untwisted multifilament yarn with at least one colorant;
    twisting the coated multifilament yarn; and
    heating the twisted multifilament yarn to a temperature and for a time sufficient to at least partially fuse adjacent filaments together while stretching the yarn to a stretch ratio from about 3 to about 10 to form the colored monofilament ultrahigh molecular weight polyolefin line.

2. The method of claim 1, wherein the step of coating comprises coating the substantially untwisted multifilament yarn with a plurality of colorants in series along the length of the substantially untwisted multifilament yarn.

3. The method of claim 2, wherein each colorant is applied as a coloring composition comprising the colorant and a thermoplastic resin carrier.

4. The method of claim 3, wherein the thermoplastic resin carrier comprises a polyolefin resin.

5. The method of claim 4, wherein the polyolefin resin comprises a polyolefin copolymer.

6. The method of claim 3, wherein the thermoplastic resin carrier has a lower melting point than the ultrahigh molecular weight polyolefin yarn.

7. The method of claim 1, wherein the at least one colorant has a luminescent response when exposed to ultraviolet light or infrared light.

8. The method of claim 7, wherein the at least one colorant has a luminescent response when exposed to ultraviolet light.

9. The method of claim 8, wherein the at least one colorant is applied to the entire length of the substantially untwisted multifilament yarn.

10. The method of claim 7, wherein the at least one colorant comprises an inorganic material selected from the group consisting of $La_2O_2S$:Eu, $ZnSiO_4$:Mn, and $YVO_4$:Nd.

11. The method of claim 7, wherein the colorant is applied as a coloring composition comprising the colorant and a thermoplastic resin carrier.

12. The method of claim 11, wherein the thermoplastic resin carrier comprises a polyolefin resin.

13. The method of claim 12, wherein the polyolefin resin comprises a polyolefin copolymer.

14. The method of claim 11, wherein the thermoplastic resin carrier has a lower melting point than the ultrahigh molecular weight polyolefin yarn.

15. The method of claim 11, wherein the coloring composition comprises from about 1 to about 40 percent by weight of the multifilament yarn after drying.

16. A monofilament ultrahigh molecular weight polyolefin line made according to the method of claim 1, wherein the line is selected from the group consisting of fishing line, kite string, bow string, tennis racket string, parachute string, sewing thread, yachting rope, and lifting rope.

17. A method of making colored monofilament ultrahigh molecular weight polyolefin line, the method comprising the steps of:
    feeding at least one substantially untwisted multifilament ultrahigh molecular weight polyolefin yarn having a length;
    coating the substantially untwisted multifilament yarn with a plurality of colorants in series along the length of the substantially untwisted multifilament yarn;
    twisting the coated multifilament yarn; and
    heating the twisted multifilament yarn to a temperature and for a time sufficient to at least partially fuse adjacent filaments together while stretching the yarn to a stretch ratio from about 3 to about 10 to form the colored monofilament ultrahigh molecular weight polyolefin line.

18. A method of making colored monofilament ultrahigh molecular weight polyolefin line, the method comprising the steps of:

feeding at least one substantially untwisted multifilament ultrahigh molecular weight polyolefin yarn having a length;

coating at least a portion the length of the substantially untwisted multifilament yarn with at least one colorant, wherein the at least one colorant has a luminescent response when exposed to ultraviolet light or infrared light;

twisting the coated multifilament yarn; and heating the twisted multifilament yarn to a temperature and for a time sufficient to at least partially fuse adjacent filaments together while stretching the yarn to a stretch ratio from about 3 to about 10 to form the colored monofilament ultrahigh molecular weight polyolefin line.

\* \* \* \* \*